Patented June 30, 1942

2,288,293

UNITED STATES PATENT OFFICE 2,288,293

MANUFACTURE OF LAMINATED PAPER, CARDBOARD, AND THE LIKE

Colin Metcalf, Wilmslow, England

No Drawing. Application July 6, 1939, Serial No. 283,065. In Great Britain July 21, 1938

4 Claims. (Cl. 154—40)

This invention relates to the manufacture of laminated paper, cardboard and the like wherein a cement is used of the kind in which pitch, bitumen or the like form the basic element.

It has been proposed to make laminated paper or cardboard of two or more thicknesses cemented together by means of latex, with or without a small quantity of wood tar (pine tar) resin, mineral oils, bitumen, gelatine, resin soaps, gumarabic etc. to increase the adhesive power of the latex, such latex being applied so as to provide a coherent impervious and tough membrane of rubber between adjacent layers of the paper or cardboard. Such method of manufacture has also been applied using crepe paper for its flexible and stretchable properties. In both cases, however, it has been emphasized that a sufficient quantity of the latex must be applied to provide a coherent layer of rubber cementing together the adjacent layers of material, and at the same time to give adequate waterproofing or moisture proofing properties.

The use of latex in such manner appreciably increases the cost of manufacture of laminated paper or cardboard compared with the previously known method of manufacture in which pitch alone was employed. The latex process, however, avoids the disadvantage of such earlier process in that under hot conditions the pitch was liable to migrate through the paper and cause staining of the goods whilst at the same time such absorption by the paper occurs at the expense of the cementing together of the laminations.

The object of the present invention is to provide an improved laminated sheet material or the like which is cheap to produce and which whilst employing pitch, bitumen or the like such as asphalt, wax tailings, etc. as the basic element of the adhesive and water-proofing medium avoids the disadvantage of migration, as above described.

This invention is based upon a discovery that the addition of a small quantity of rubber in the form of latex to an emulsion of pitch, bitumen or the like produces an excellent cement for use in the manufacture of laminated paper or for like purposes, which may be applied or used in small and economical quantities yet sufficient to enable the pitch, bitumen or like constituent to cement the laminations securely together whilst providing a waterproofing property, the rubber apparently operating to retard or substantially prevent migration of the pitch or the like into the paper or other absorbent material.

According to the invention, a laminated paper, cardboard or the like is characterised in that the laminations are united by an adhesive comprising an aqueous emulsion of pitch, bitumen or the like to which has been added a small quantity of rubber in the form of latex to retard migration of the pitch or the like into the material.

As in the old method the pitch, bitumen or the like performs two functions. Firstly, it acts as an adhesive adequately to combine the sheet materials together and secondly, to give a moisture or waterproofing film. It is important therefore that such pitches or bitumens selected for use possess tenacious or adhesive properties as well as being resistant to water. Such products as oils, waxes and greases could not be used in place of bitumen as they do not give the necessary adhesion, and are therefore quite unsuitable.

Below are given several examples of the invention for the composition, manufacture and use of the improved cement.

Example No. 1

| | Parts |
|---|---|
| 50% petroleum pitch aqueous emulsion | 9 |
| 70% latex (i. e. 70% dry rubber content) | 1 |

In preparing the cement the latex, which is a known commercial product and contains certain stabilisers and possibly other added matter, may be added to the pitch emulsion, or vice versa, which latter may be slightly warm so long as the temperature is not high enough to cause coagulation of the rubber. Instead of 1 part of 70% latex there could be used 2 parts of 35% latex or other corresponding volume proportional to the dry rubber content thereof. The only difference resulting would be the slightly higher water content of the cement when the less concentrated latex is used.

Obviously the concentration of the pitch emulsion could be varied in the same way.

It is to be observed that the cement, when made according to the formula above given and when it has lost its water content by absorption or evaporation, gives a deposit of which about 13½% is rubber and 86½% is petroleum pitch.

In using the above cement for the manufacture of two-ply laminated kraft paper a small quantity is applied to the face of both sheets by means of back filling rollers and doctor knives. The two sheets are then brought together and go through rollers providing a tight nip, which rollers may be heated or cold. The cement was applied in quantity sufficient to provide on drying, a deposit of about 22 grs. per square metre having about 3 grs. dry rubber content.

Example No. 2

| | Parts |
|---|---|
| 50% aqueous emulsion elastic cottonseed pitch | 10 |
| 60% latex | 1 |

This mixture was applied successfully to several different qualities of light weight plain papers by coating both webs by passing them over the top of back-filling rollers revolving in the liquor. The two sheets were joined together at a pair of tight nips which were heated to about 75° C. It is estimated that the united coatings on drying provided a deposit of about 20 to 25 grs./sq. metre.

Example No. 3

| | Parts |
|---|---|
| 60% aqueous emulsion brown wax tailings (M. P. 120° F.) | 5 |
| 60% latex | 1 |

This was applied as in Example No. 2 and is particularly suitable where a black adhesive is undesirable. The estimated deposit on drying was about 20 to 25 grs. per square metre.

Example No. 4

| | Parts |
|---|---|
| 60% aqueous emulsion of wool pitch | 4 |
| 50% aqueous emulsion of bitumen | 4 |
| 60% latex | 1 |

This was used to combine successfully either two kraft papers or two crepe papers, and was applied in both cases as described in Example No. 2. The estimated deposit on drying was about 25 grms. per square metre for kraft, and 30 grs. per square metre for crepe.

Example No. 5

| | Parts |
|---|---|
| 60% aqueous emulsion of bitumen | 6 |
| China clay | 1 |
| 35% latex | 2 |

Two crepe papers were combined with this mixture by coating one web only and subsequently passing the two sheets through two pairs of light nips. The estimated deposit on drying was about 35 grs. per square metre.

Example No. 6

| | Parts |
|---|---|
| 50% aqueous emulsion of stearine pitch | 6 |
| 50% latex | 1 |

This again was used on two crepe papers, but the material was on this occasion sprayed onto both webs. The two sheets subsequently passing through three sets of light nips which were cold. The estimated deposit on drying was about 20 to 30 grs. per square metre.

Example No. 7

A crepe web was combined to Hessian by applying the mixture given in Example No. 5 to the paper by means of the roller method of application, while the Hessian was sprayed with the mixture given in Example No. 6. The estimated deposit on drying was about 40 to 50 grs. per square metre.

The cements above described may be applied in other quantities and by other suitable means than stated in the above examples. Application by spraying is particularly suitable for treating crepe or like delicate paper, and the quantity and pressure used in uniting the sheets will be varied according to the nature of the paper and the result desired. Different kinds of paper will obviously require different quantities of cement, for example, a crepe paper will require more than the kraft. Very little experiment will be required to ascertain a suitable quantity for any particular kind of paper or cardboard. The main feature of the invention is that whereas when using only pitch it is almost impossible to prevent migration into paper or other absorbent material, the addition of only a small quantity of latex checks such migration and ensures maintained cohesion of the parts as well as preventing the risk of staining by the pitch.

It has also been observed that by preventing this migration a considerably less quantity of pitch is required to do the bending compared with the old method by which it was always necessary to provide an excess to allow for migration. A more supple and flexible material is thus obtained.

Whilst, in the first example above described, a dry rubber content of about 14% provides a suitable proportion for the purpose described, such proportion may for some purposes be reduced or increased to say 20% or 25% but beyond that proportion no advantage is obtained as regards the feature of preventing migration. Where the danger of migration is lower owing either to the less porous character of the paper or other material on which the cement is to be used, or less severe temperature conditions are to be expected or where a less fluid pitch or bitumen is selected, the percentage of rubber may be reduced without material detriment to the required properties and at the same time reducing the cost of manufacture of the cement.

In dealing with crepe papers, one of the problems is to apply the adhesive, especially if of a thick viscous or pasty nature, without stretching or otherwise impairing the crepe nature of the paper, and furthermore, after having applied the adhesive there is still the problem of uniting the webs using sufficient pressure to effect union and cohesion without similarly damaging the crepe quality of the paper. The property of the improved cement herein is such that it can be used as a thin liquid sprayed onto the paper, small quantities only being required, both results arising from the small migration or penetration into the paper so as to provide and maintain the cement as an adhesive between the webs of paper.

In addition to the stabilizer or stabilizers which may be present in the latex, the cement may contain other added matter such as emulsifiers or fillers but only in relatively small quantities so as not to impair the adhesive and other properties of the bitumen, pitch or the like.

The expressions "latex" or "rubber in the form of latex" are used generically to include not only natural latex, whether in normal concentration or concentrated or otherwise suitably prepared, but also artificial or synthetic emulsions or aqueous dispersions of rubber or rubber-like material, whether compounded or not.

Asphalt is well known for coating roads, insulation of concrete, impregnation and the like and mixtures of latex, or the like, and asphalt emulsions in various proportions are well known, and it has been proposed, by adopting a concentration for both the latex and the bitumen emulsion of not less than 40%, to prevent separation of the constituents, the mixture, with suitable added material, being usable for coating roads or floors, for waterproofing or for pressing into solid forms. Such uses of asphalt or mixtures of latex and aqueous emulsions of asphalt have obviously no association with the problem of the migration of the bitumen in laminated paper or the like.

Mixtures of latex and emulsions of waxy substances have been used for making composite sheets of fibrous materials, adhesion being obtained by heating to above the melting point of the wax.

What I claim is:

1. A method of manufacture of a laminated product of paper, cardboard and the like which comprises providing a liquid cementitious composition consisting essentially of an aqueous emulsion of a substance taken from the class consisting of pitch and bitumen having incorporated therein a sufficient amount of rubber in the form of latex to check migration of said substance through the individual layers of said product but insufficient to impair the adhesiveness of said substance, said amount being between about 10% and 25% based on the dried deposit of the whole cementitious composition, the amount of water in the composition being such that the same adheres to a sheet without any substantial amount of penetration, the latex containing from 35%–70% of rubber, applying said composition to one side of a sheet of said material by pressing the viscous mass onto the same, and pressing a plurality of such sheets together to cause the same to adhere.

2. A method of manufacture of a laminated product of paper, cardboard and the like which comprises providing a liquid cementitious composition consisting essentially of an aqueous emulsion of a substance taken from the class consisting of pitch and bitumen having incorporated therein a sufficient amount of rubber in the form of latex to check migration of said substance through the individual layers of said product but insufficient to impair the adhesiveness of said substance, said amount being between about 10% and 25% based on the dried deposit of the whole cementitious composition, the amount of water in the composition being such that the same adheres to a sheet without any substantial amount of penetration, the latex containing from 35%–70% of rubber, applying said composition to one side of a sheet of said material by pressing the viscous mass onto the same while maintaining an elevated temperature of the pressing means, and pressing a plurality of such sheets together to cause the same to adhere.

3. A method of manufacture of a laminated product of paper, cardboard and the like which comprises providing a liquid cementitious composition consisting essentially of an aqueous emulsion of a substance taken from the class consisting of pitch and bitumen having incorporated therein a sufficient amount of rubber in the form of latex to check migration of said substance through the individual layers of said product but insufficient to impair the adhesiveness of said substance, said amount being between about 10% and 25% based on the dried deposit of the whole cementitious composition, the amount of water in the composition being such that the same adheres to a sheet without any substantial amount of penetration, the latex containing from 35%–70% of rubber, applying said composition to one side of a sheet of said material by pressing the viscous mass onto the same, the amount of composition applied being from about 20 to 50 grams per square meter of surface on a dry basis, and pressing a plurality of such sheets together to cause the same to adhere.

4. A method of manufacture of a laminated product of paper, cardboard and the like which comprises providing a liquid cementitious composition consisting essentially of an aqueous emulsion of a substance taken from the class consisting of pitch and bitumen having incorporated therein a sufficient amount of rubber in the form of latex to check migration of said substance through the individual layers of said product but insufficient to impair the adhesiveness of said substance, said amount being between about 10% and 25% based on the dried deposit of the whole cementitious composition, the amount of water in the composition being such that the same adheres to a sheet without any substantial amount of penetration, applying said composition to one side of a sheet of said material by pressing the viscous mass onto the same, and pressing a plurality of such sheets together to cause the same to adhere.

COLIN METCALF.